United States Patent [19]

Kobayashi et al.

[11] Patent Number: 5,497,866
[45] Date of Patent: Mar. 12, 1996

[54] CURRENT COLLECTING APPARATUS

[75] Inventors: Kenji Kobayashi, Kudamatsu; Yasushi Takano, Ibaraki; Akiyoshi Iida, Mitsukaido; Masahiro Ikegawa, Ibaraki; Syuya Hagiwara, Mito; Morishige Hattori, Kudamatsu, all of Japan

[73] Assignee: Hitachi, Ltd., Tokyo, Japan

[21] Appl. No.: 330,086

[22] Filed: Oct. 26, 1994

[30] Foreign Application Priority Data

Oct. 26, 1993 [JP] Japan .................. 5-266891

[51] Int. Cl.⁶ ........................................ B60L 5/12
[52] U.S. Cl. ...................... 191/55; 191/64; 191/66
[58] Field of Search ..................... 191/45 R, 50, 191/54, 55, 57, 58, 59.1, 64, 65, 66

[56] References Cited

FOREIGN PATENT DOCUMENTS

| | | | |
|---|---|---|---|
| 2830027 | 1/1979 | Germany | 191/59.1 |
| 62-40001 | 2/1987 | Japan | 191/64 |
| 3086001 | 4/1991 | Japan | 191/65 |
| 4127803 | 4/1992 | Japan | 191/66 |
| 4-304101 | 10/1992 | Japan | . |
| 5068304 | 3/1993 | Japan | 191/55 |
| 5130706 | 5/1993 | Japan | 191/66 |
| 5146004 | 6/1993 | Japan | 191/65 |
| 5176403 | 7/1993 | Japan | 191/55 |
| 6022404 | 1/1994 | Japan | 191/65 |

*Primary Examiner*—Michael S. Huppert
*Assistant Examiner*—Scott L. Lowe
*Attorney, Agent, or Firm*—Antonelli, Terry, Stout & Kraus

[57] ABSTRACT

A current collecting apparatus provided with sliders 2 for collecting electric power from a power feeder 1, a current collector 3 for collecting power, an insulator for insulating and supporting the current collector 3, and a flexible conductor for delivering the power collected by the current collector 3 to a conductor 5, which is connected to the flexible conductor and used for supplying the power to the vehicle side. The conductor 5 and the insulator 4 are disposed so that the former is offset with respect to the latter in the crosswise direction of a railway vehicle. With this arrangement, aerodynamic noise emanating from the current collector loaded on the vehicle running at high speed can be substantially reduced.

14 Claims, 13 Drawing Sheets

CURRENT COLLECTING APPARATUS

BACKGROUND OF THE INVENTION

The present invention relates generally to current collecting apparatus for railway vehicles and more particularly to a current collecting apparatus fit for use in a vehicle on a high-speed railway.

Railway vehicles using electric power as a power source are generally equipped with current collecting apparatus on their roofs for collecting electric power by contact with overhead power lines. Japanese Patent Laid-Open No. 304101/1992 discloses a noise reducing arrangement attainable by installing sound arresters (covers) in front and behind a current collecting apparatus as means for suppressing noise. This noise reducing arrangement is such that sound arresters are respectively installed in front and behind a current collecting apparatus to place the current collecting apparatus in the airflow decelerated thereby so as to prevent not only aerodynamic noise from being produced from the current collecting apparatus but also the aerodynamic noise from radiating therefrom.

The prior art current collecting apparatus disclosed in the aforementioned patent publication is obviously intended to reduce the noise generated from the current collecting apparatus during relatively high-speed traveling. However, in the case of a high-speed railway in the next generation on which the operation is aimed at a speed of as high as 350 km/hr, there still arises a problem of aerodynamic noise originating from such noise arresters themselves and the measure taken to reduce noise by means of the current collecting apparatus can hardly be effective in high-velocity zones. Since the air resistance generated while vehicles are traveling increases in proportion to the square of the velocity, moreover, an increase in operating cost due to travel resistance originating from the sound arresters would pose a serious problem in the case of the Shinkansen in the next generation in which the commercial operation is aimed at a speed well over the present one, for example, as high as 350 km/hr.

In view of the foregoing problems, an object of the present invention is to provide a current collecting apparatus so designed as to reduce not only noise but also air resistance springing therefrom on any high-speed railway in the next generation.

SUMMARY OF THE INVENTION

In order to achieve the object above, a current collecting apparatus according to the present invention comprises a current collector for collecting electric power from a power feeder, an insulator for insulating and supporting the current collector on a vehicle, and a conductor for conducting the power received from the current collector to a load, the conductor and the insulator being disposed a predetermined distance apart.

Each of the insulator and the conductor has a central part in the form of an extended shaft and a plurality of fins arranged at predetermined intervals, the fins being greater than the diameter of the central part. The fins of at least either insulator or conductor are fitted to the central part thereof at a predetermined angle with respect to the axial direction of the central part.

Further, the conductor and the insulator are disposed a predetermined distance apart, and each of the insulator and the conductor has a central part in the form of an extended shaft and a plurality of fins disposed at predetermined intervals, the fins being greater than the diameter of the central part, and besides the fins of at least either insulator or conductor are fitted to the central part thereof at a predetermined angle with respect to the axial direction of the central part.

Further, at least either insulator or conductor has a streamlined cross section in parallel to the floor face of the vehicle.

Further, the end portion of the conductor on the power feeder side has a curved surface.

Further, the joint between the insulator and the current collector has a curved surface.

Further, a predetermined space is provided between the end portion of the conductor on the current collector side and the current collector.

Further, a flexible conductor for conducting the electric power received from the current collector to the conductor has a streamlined vertical cross section in the longitudinal direction.

Further, the current collector is tilted forward in the direction in which the vehicle runs.

Moreover, the current collector is provided with drainage holes.

The aerodynamic noise is produced when disturbance in the air exists near the surface of an object. If, therefore, a conductor is placed on the downstream side of an insulator where such disturbance is stronger, fluctuations in pressure will be induced on the surface of the conductor and sound waves will be excited to cause resulting sounds to be radiated therefrom. According to the present invention, the conductor is located in a position on the downstream side of the insulator where the disturbance is weak instead of a position on the downstream side thereof where the disturbance is strong by shifting the conductor (hereinafter called "offset") so as to reduce the noise emitting from a current collecting apparatus. Moreover, reducing the noise of the current collecting apparatus is promoted by streamlining the longitudinal vertical cross sections of the insulator and the conductor in place of conventional cylindrical ones.

In order to decrease steady dynamic lift acting on the current collector, the current collector is tilted forward in the direction in which a vehicle runs so as to lessen the influence of dynamic lift fluctuations acting on the current collector at the time the vehicle rushes in and out a tunnel and to restrain the generation of such steady dynamic lift acting thereon.

DESCRIPTION OF THE PREFERRED EMBODIMENTS

Referring to FIGS. 1–25, embodiments of the present invention will be described.

Figure 1:
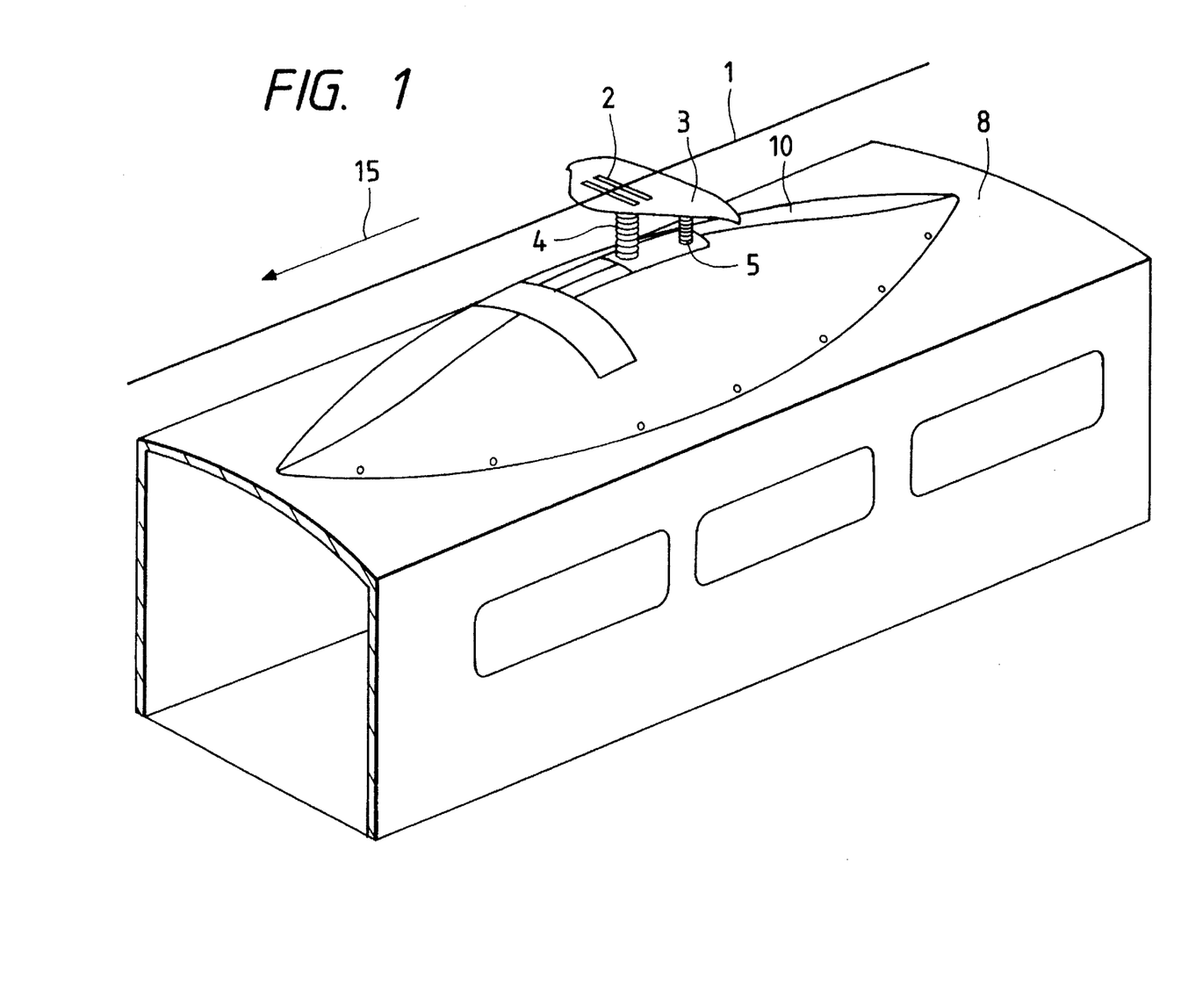
FIG. 1 is an external appearance of a high-speed vehicle to which a current collecting apparatus embodying the present invention is applied.
Figure 2:
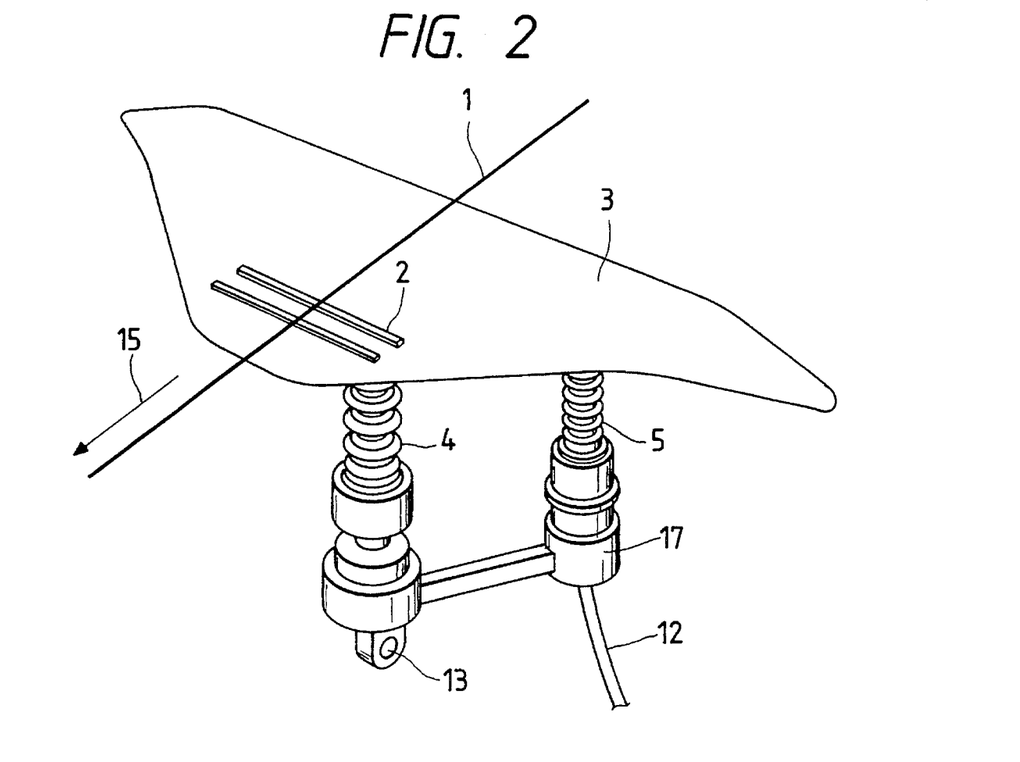
FIG. 2 is a perspective view of the current collecting apparatus of FIG. 1.
Figure 3:
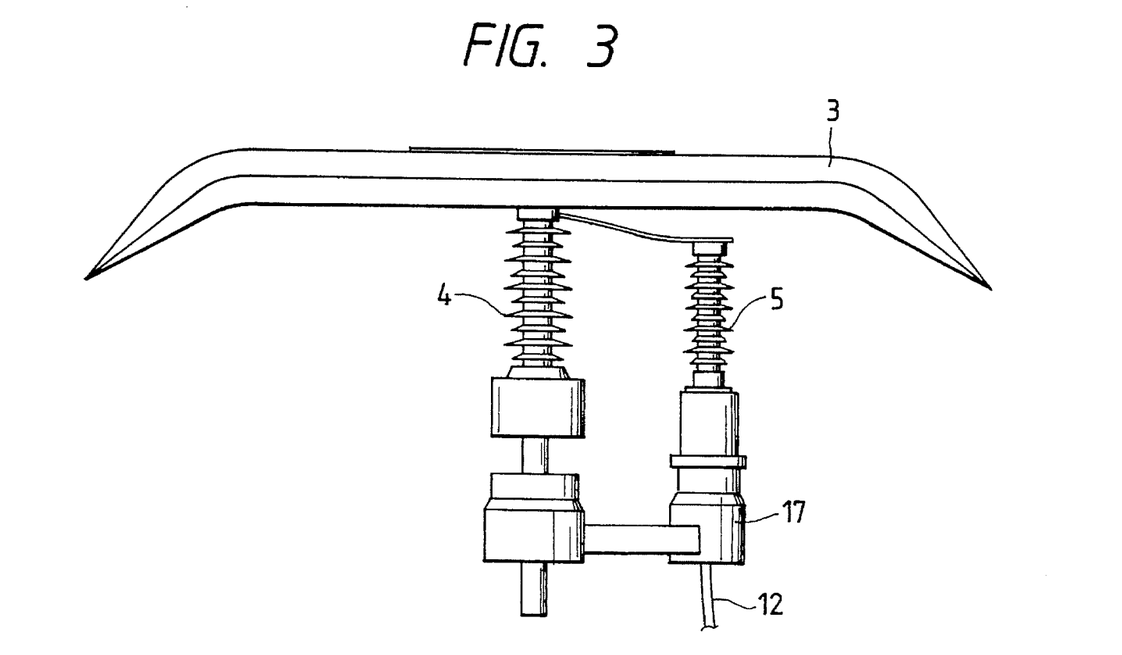
FIG. 3 is an elevational view of the current collecting apparatus of FIG. 1.
Figure 4:
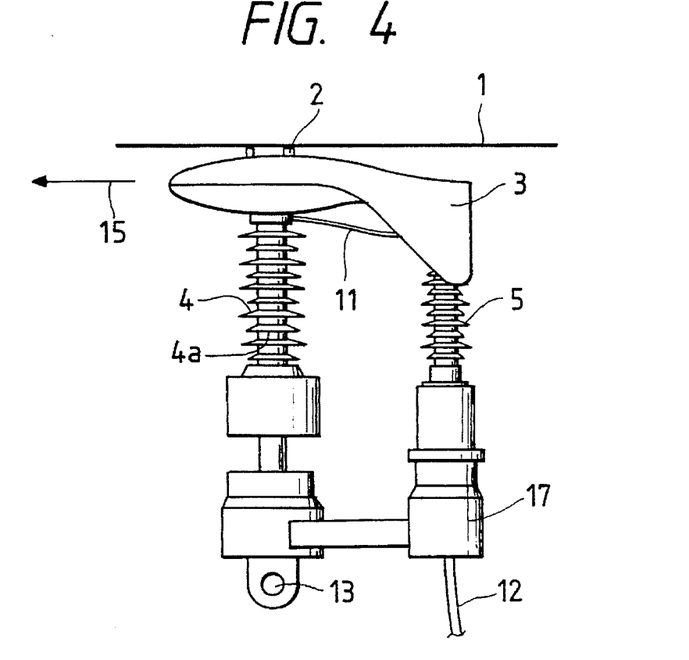
FIG. 4 is a side view of the current collecting apparatus of FIG. 1.

FIG. 1 is a partial perspective view of a railway vehicle which carries a current collecting apparatus embodying the present invention. FIGS. 2, 3 and 4 are perspective, elevational and side views of a current collecting apparatus embodying the present invention with an insulator 4 and a conductor 5 which are supported with a pedestal 17. Further, FIGS. 5, 6 and 7 are perspective, elevational and side views of another current collecting apparatus embodying the present invention with an insulator 4 and a conductor 5 which are supported with pedestals 17a, 17b, respectively.

The current collecting apparatus is designed to supply electric power via a flexible conductor 11, the conductor 5 and cable 12 to a vehicle 8, the power being fed from a power feeder 1 to a current collector 3 by contact therewith, and loaded on the vehicle 8 for which various measures have been taken to reduce noise. While no current is collected, the current collecting apparatus is housed in a housing dome 10 by turning a pivot mechanism 13 fitted to its lower part. In FIGS. 1, 2, 4, 5 and 7, an arrow 15 denotes the direction in which the vehicle runs.

The conductor 5 of this current collecting apparatus is placed a predetermined distance apart from the insulator 4 for insulating and supporting the current collector 3 in the crosswise direction of the vehicle (offset arrangement). Generally, aerodynamic noise is produced when disturbance in the air exists near the surface of an object. If, therefore, the conductor 5 is placed on the downstream side of the insulator 4 where such disturbance is stronger, fluctuations in pressure will be induced on the surface of the conductor 5 and sound waves will be excited to cause resulting sounds to be radiated therefrom. In order to avoid this phenomenon, the conductor 5 is located in a position instead of what is on the downstream side of the insulator 4 where the disturbance is strong by offsetting the conductor to reduce the noise emitting from the current collecting apparatus.

Figure 5:
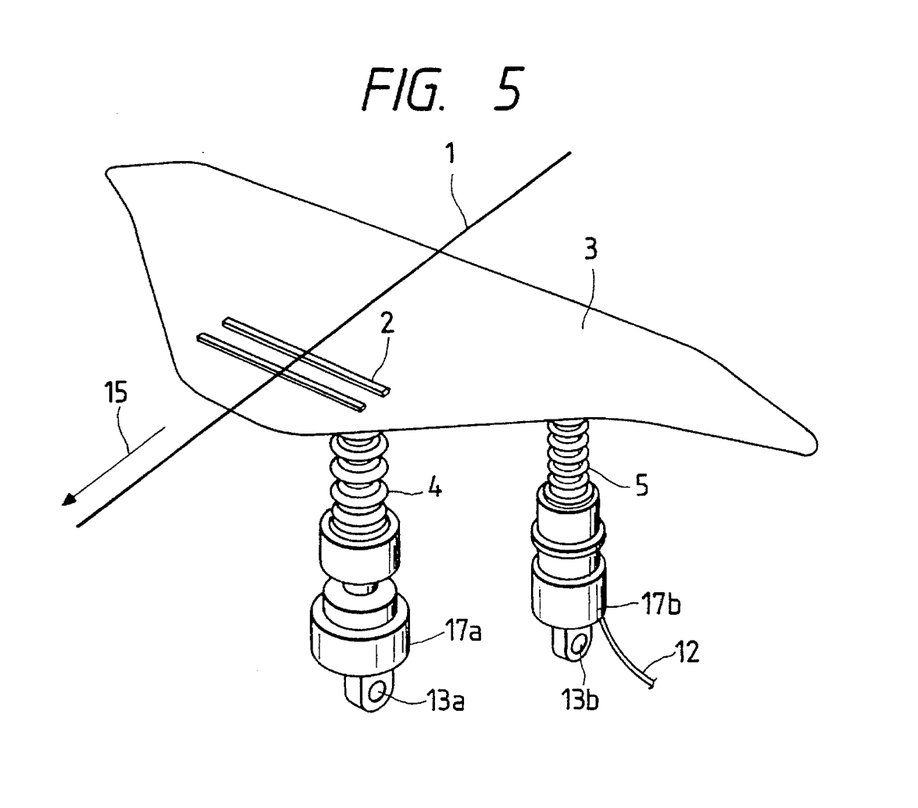
FIG. 5 is a perspective view of another current collecting apparatus embodying the present invention.
Figure 6:
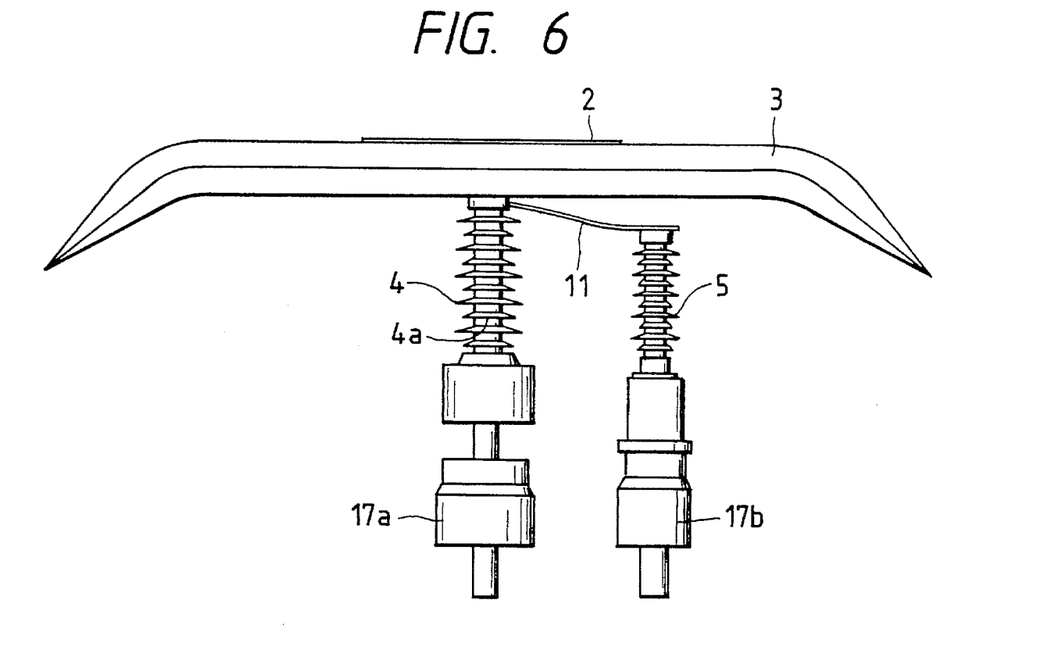
FIG. 6 is an elevational view of the current collecting apparatus of FIG. 5.
Figure 7:
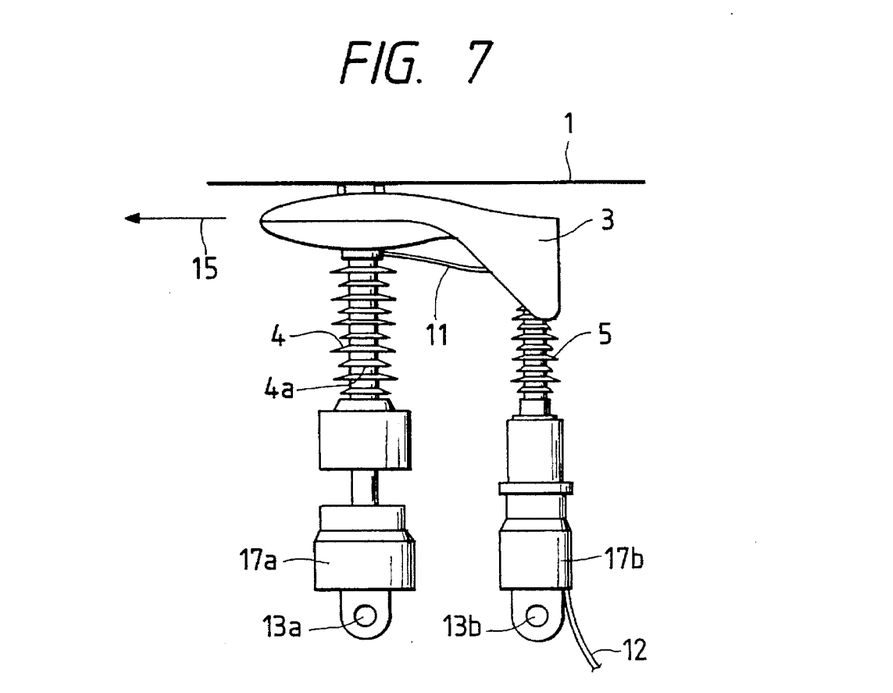
FIG. 7 is a side view of the current collecting apparatus of FIG. 5.

The current collecting apparatus shown in FIGS. 5, 6 and 7 is provided with the insulator 4 for supporting the current collector 3, the pedestals 17a, 17b and pivot mechanisms 13a, 13b right under conductive cable heads for supplying the electric power collected from the power feeder 1 to the vehicle 8.

The dynamic lift occurs to the current collector 3 when the vehicle 8 rushes in and out a tunnel and passes by another can be taken by the pivot mechanism 13a installed right under the insulator 4 supporting the current collector. Therefore, no moment centering on the pivot mechanism 13a is produced notwithstanding the dynamic lift fluctuations occurring to the current collector 3. The pivot mechanism 13a thus contributes to the stability of the current collecting apparatus itself. Moreover, the provision of the pivot mechanism 13b right under the conductor 5 minimizes the displacement of a cable 12 coupled to the vehicle 8 from the lower end of the conductor 5 when the current collecting apparatus is accommodated in the housing cover while no electric power is supplied, thus decreasing metal fatigue due to the repetition of displacement. In consequence, the replacement period of the cable 12 can be made longer.

Figure 8:
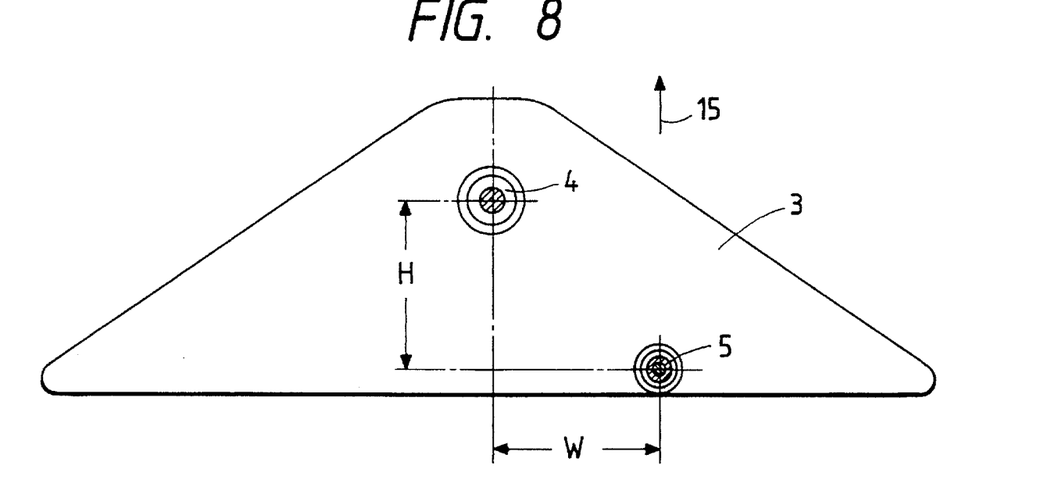
FIG. 8 is a bottom view showing the positional relation between the insulator 4 and the conductor 5 according to the present invention.

FIG. 8 is a bottom plan view of the current collecting apparatus as an embodiment of the present invention. In this case, the distance H between the center of the insulator 4 and that of the conductor 5 in the longitudinal direction of the vehicle is set at 420 mm and the distance W therebetween in the crosswise direction thereof is set at 500 mm. In other words, W=500 mm represents the offset quantity. The noise reduction effect is unachievable unless the offset quantity W is substantially great. As shown in FIG. 8, the conductor 5 is so positioned as to be covered with the current collector 3, whereby fine metal powder resulting from arcs as well as the friction between the power feeder 1 and sliders 2 is prevented from flying in all directions and sticking to the surface of the conductor 5. Breakdown is thus prevented from arising on the surface of the conductor 5, which contributes to improving insulation reliability. Further, it is desirable to connect the conductor 5 to the current collector 3 by the shortest route as shown in the FIG. 17, from the point of view of the aerodynamics noise reduction.

Figure 9:
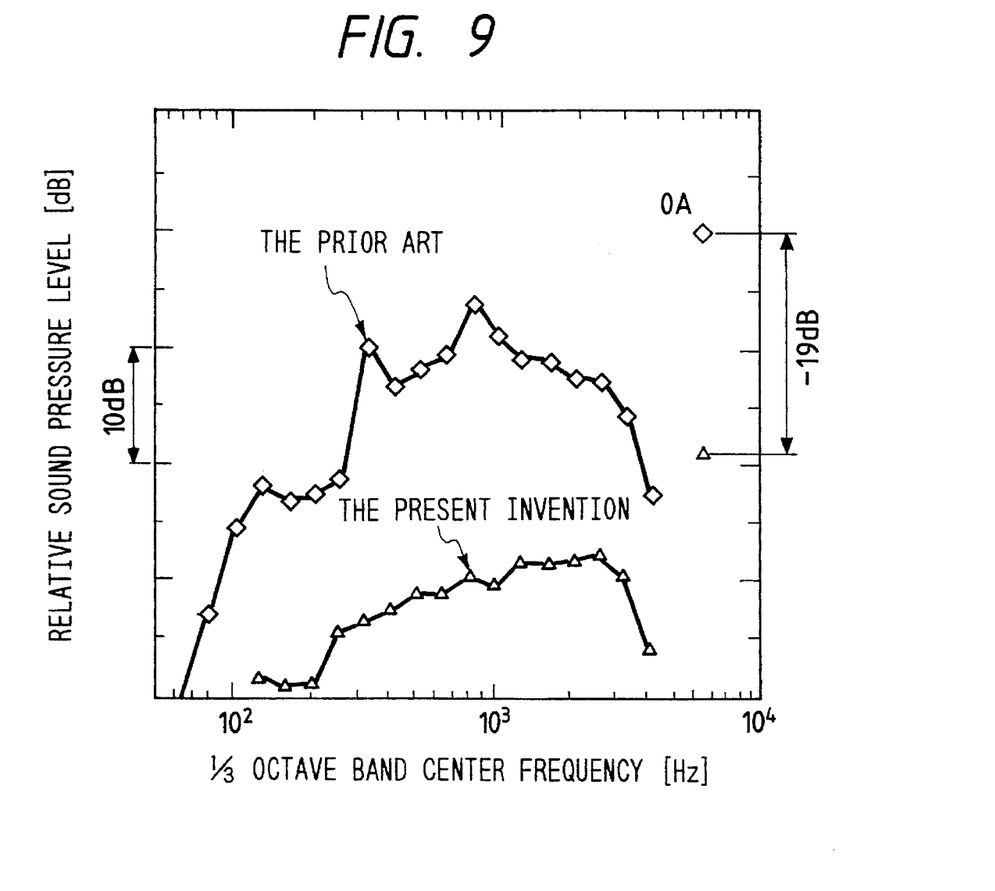
FIG. 9 is a graphic representation showing the noise reduction effect of the current collecting apparatus according to the present invention resulting from wind-tunnel tests.

FIG. 9 shows the relation between relative sound power levels (dB) and frequencies based on the estimated actual noises resulting from wind-tunnel tests as what is illustrative of noises emanated from the conventional current collecting apparatus of a lower-frame crossing type that has been employed in the existing Shinkansen vehicles "Nozomi" and the current collecting apparatus according to the present invention in which two of the cylindrical insulator 4 and the offset conductor 5 are installed right under the triangular current collector 3. White diamond-shaped symbols in FIG. 9 represent the test results of the conventional current collecting apparatus, whereas white triangular symbols denote those of the current collecting apparatus according to the present invention. The overall (OA) relative sound pressure level of the current collecting apparatus according to the present invention is made lower by about 19 decibels (dB) than that of the conventional current collecting apparatus with the effect of greatly improving noise reduction.

Figure 10:
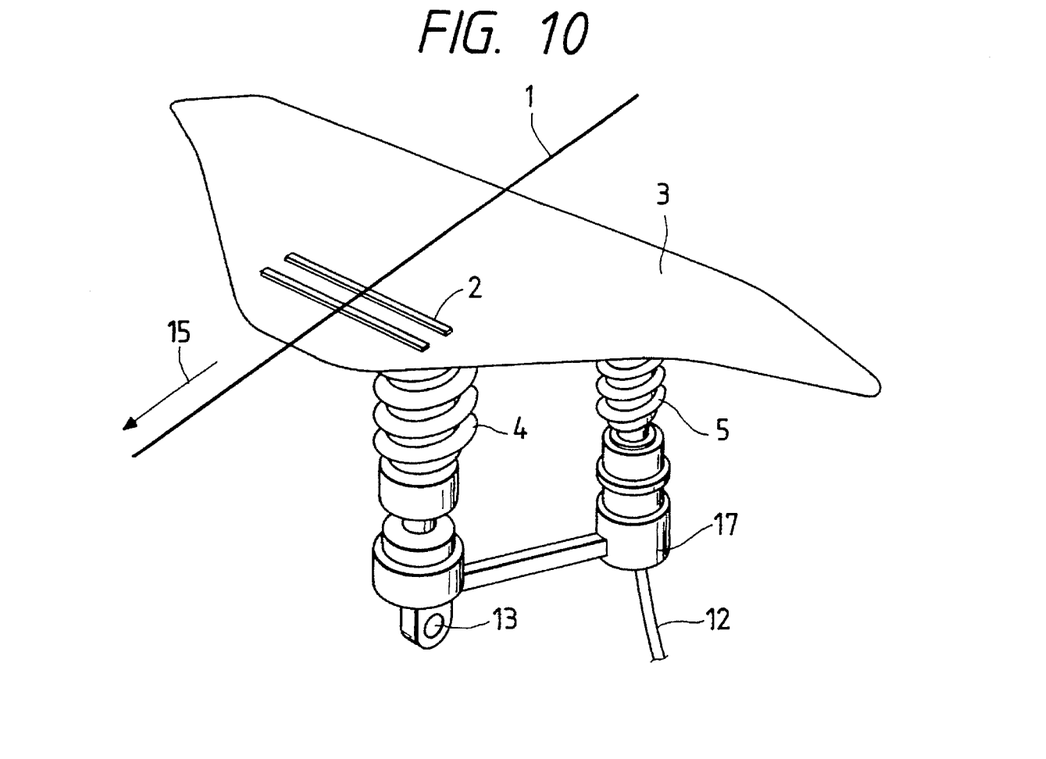
FIG. 10 is a perspective view of still another current collecting apparatus embodying the present invention.
Figure 11:
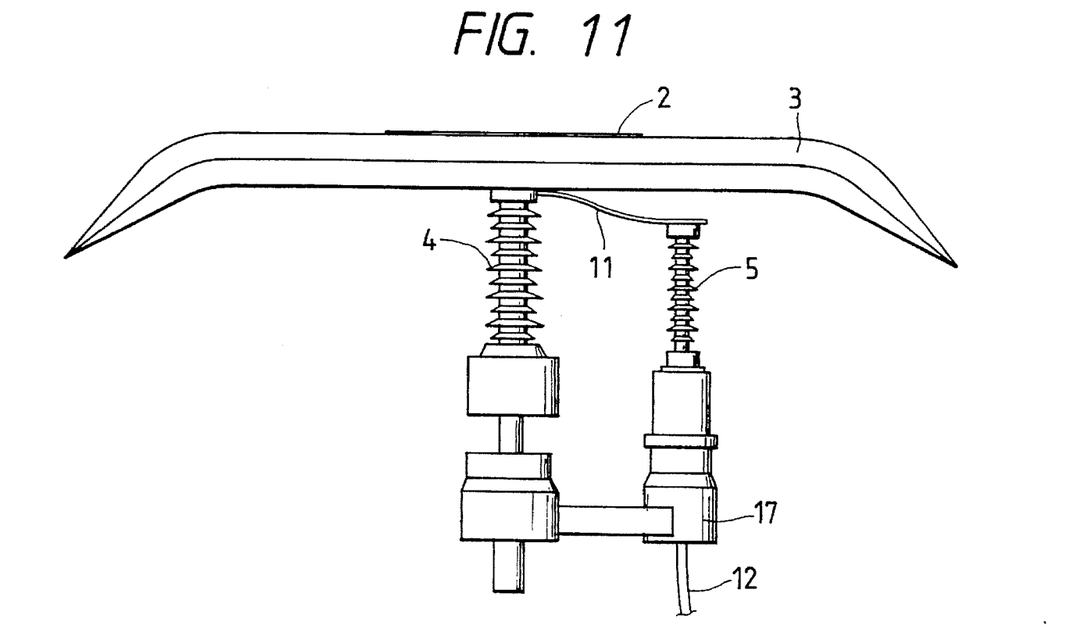
FIG. 11 is an elevational view of the current collecting apparatus of FIG. 10.
Figure 12:
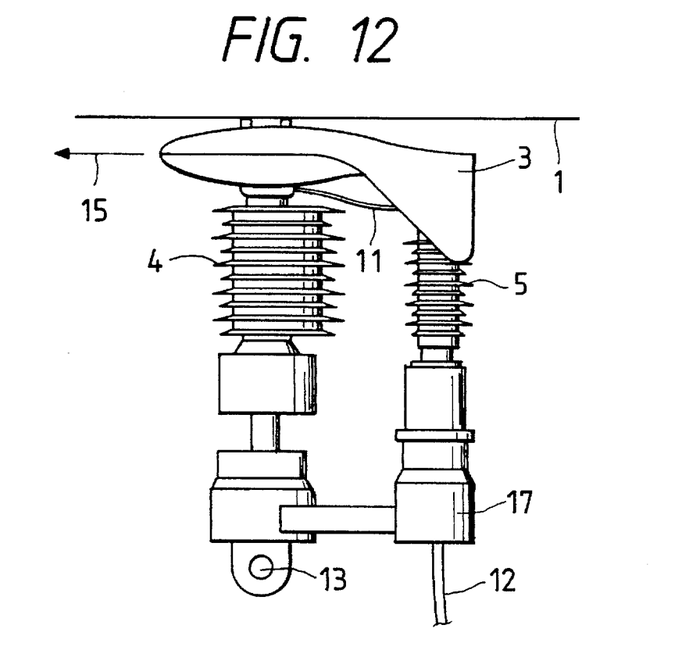
FIG. 12 is a side view of the current collecting apparatus of FIG. 10.
Figure 13:
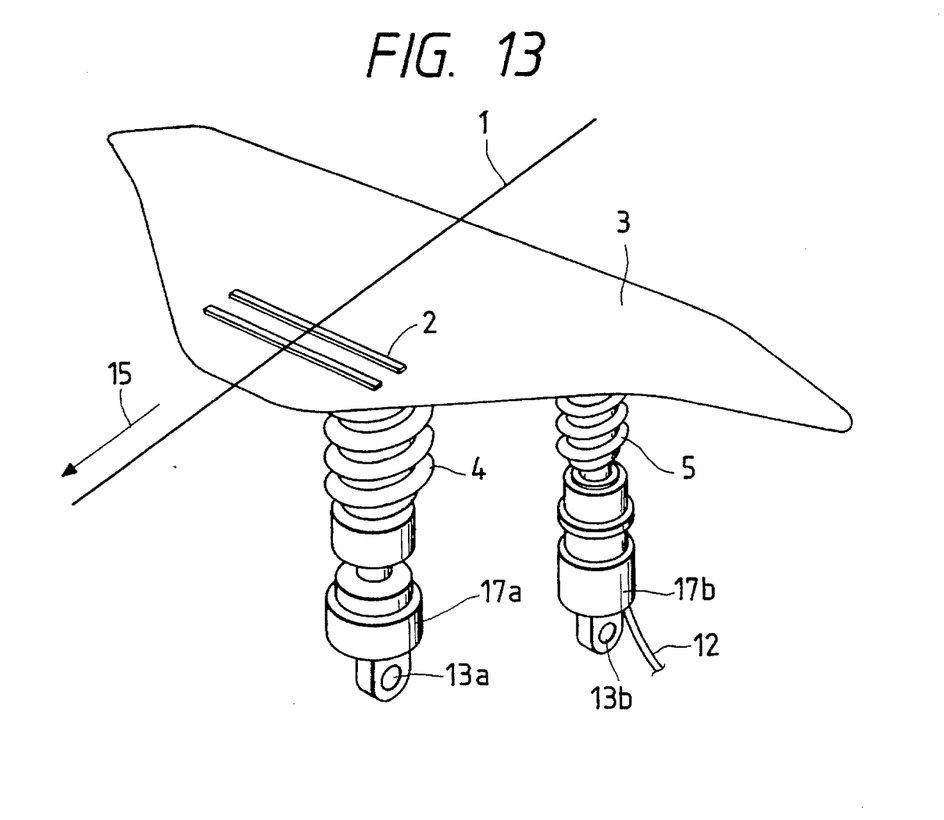
FIG. 13 is a perspective view of still another current collecting apparatus embodying the present invention.
Figure 14:
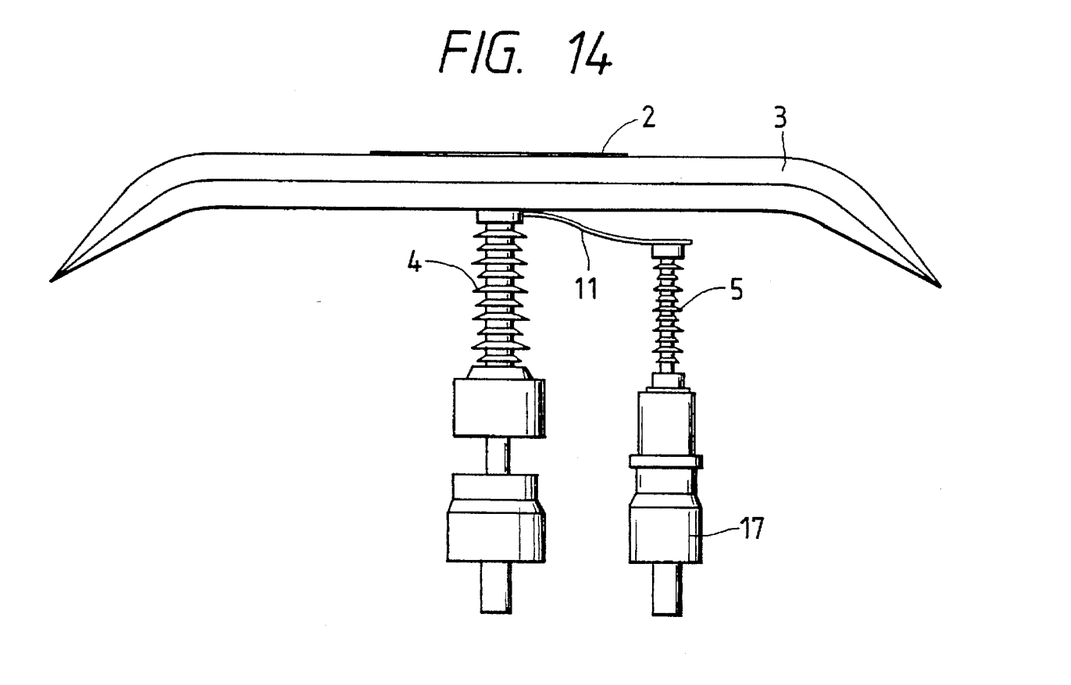
FIG. 14 is an elevational view of the current collecting apparatus of FIG. 13.
Figure 15:
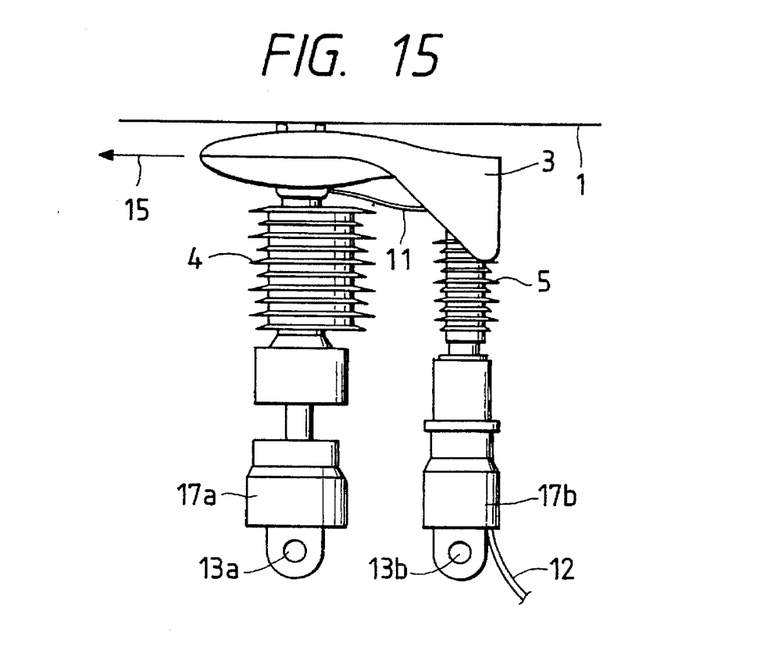
FIG. 15 is a side view of the current collecting apparatus of FIG. 13.
Figure 16:
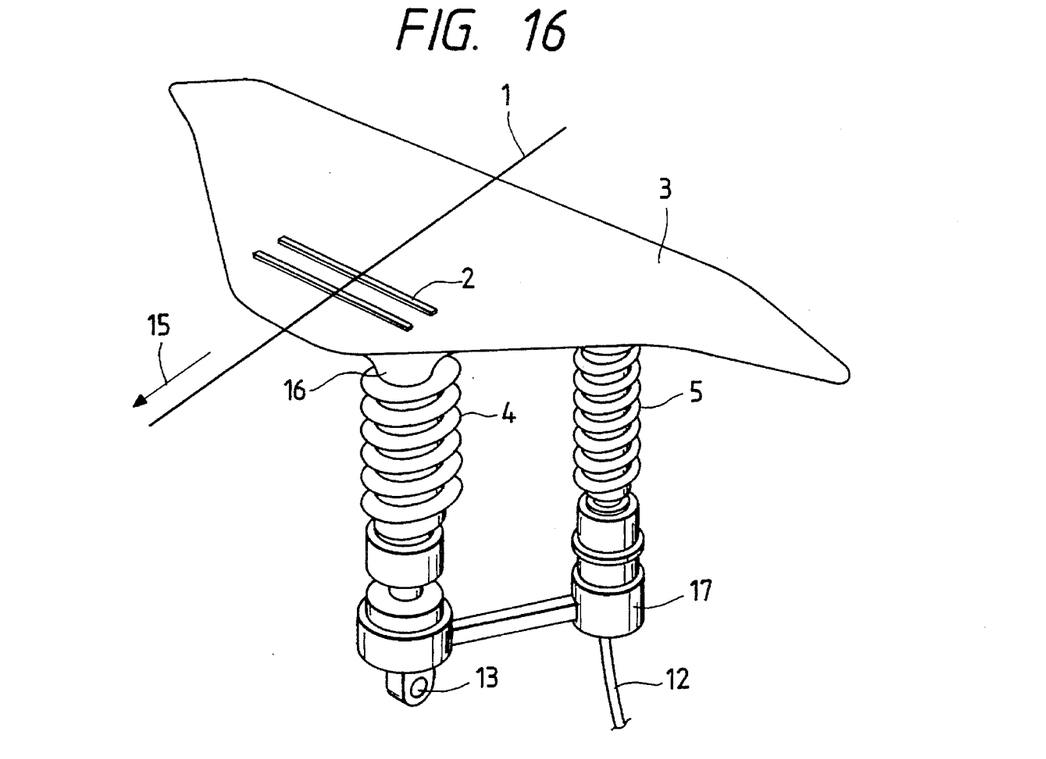
FIG. 16 is a perspective view of still another current collecting apparatus embodying the present invention.

FIGS. 10 through 15 inclusive, show still another embodiment of the present invention. FIGS. 10, 11 and 12 are perspective, elevational and side views of a current collecting apparatus having a common pedestal 17 for supporting an insulator 4 and a conductor 5, whereas FIGS. 13, 14 and 15 are perspective, elevational and a side view of the current collecting apparatus having pedestals 17a, 17b for respectively supporting the insulator 4 and the conductor 5. In this embodiment of the present invention, the cross sections of the insulator 4 and the conductor 5 in parallel to the floor face of the vehicle are streamlined. With the streamlined cross sections of the insulator 4 and the conductor 5 thus arranged, the airflow becomes smoother than what passes by the conventional cylindrical insulator 4 and the conductor 5, accordingly making aerodynamic noise difficult to develop. As a result, a lower-noise current collecting apparatus can be built up.

When the insulator 4 thus configured is employed, the advantage with respect to an edge face length, that is, the sum total of the length of an external line on one side of the axial cross section of the insulator 4 as one of the factors essential to the insulator 4 is as in the following. In the case of the conventional cylindrical insulator 4, a low-pressure plane is generated on the downstream side of the insulator 4 when the vehicle runs at high speed. In order to avoid the breakdown caused by a pressure drop, the edge face distance has heretofore been overestimated to counterbalance the pressure drop. However, some equipment conditions surrounding the insulator 4 may not permit any increase in the dimensions of the insulator 4 even when it is attempted to increase the edge face distance. In such a case, the appearance of any site where static pressure is extremely low on the downstream side of the insulator 4 can be avoided by streamlining the insulator 4 and this not only prevents the breakdown due to the voltage drop but also minimizes an increase in the edge face distance. By applying the configuration above to the conductor 5, similar effects will be anticipated.

FIGS. 16 through 19 inclusive, show still another embodiment of the present invention. FIGS. 16, 17, 18 and 19 are perspective, elevational and side views of a current collecting apparatus having a streamlined smooth joint 16 between a current collector 3 and an insulator 4, and a bottom view of a current collector 3 as viewed from a vehicle 8 toward a power feeder 1. The cross sections of the insulator 4 and a conductor 5 are similar to those shown in FIGS. 10 through 15. The streamlined joint 16 between the current collector 3 and the insulator 4 is intended to obviate an acute angle. If the current collector 3 and the insulator 4 are joined at an acute angle, a secondary airflow will be generated and may thus increase travel resistance. When an airflow near the wall surface sharply changes, moreover, aerodynamic noise may readily be produced as the airflow change accompanies pressure fluctuations. As the joint 16 between the current collector 3 and the insulator 4 is streamlined, a back flow arising on the downstream side of the insulator 4 can be reduced further in comparison with the case of the cylindrical insulator 4, which contributes to reducing the dynamic lift caused by the velocity differential of the air current decelerated by the insulator 4 to the current collector 3 from the vehicle side toward the power feeder 1.

Figure 17:
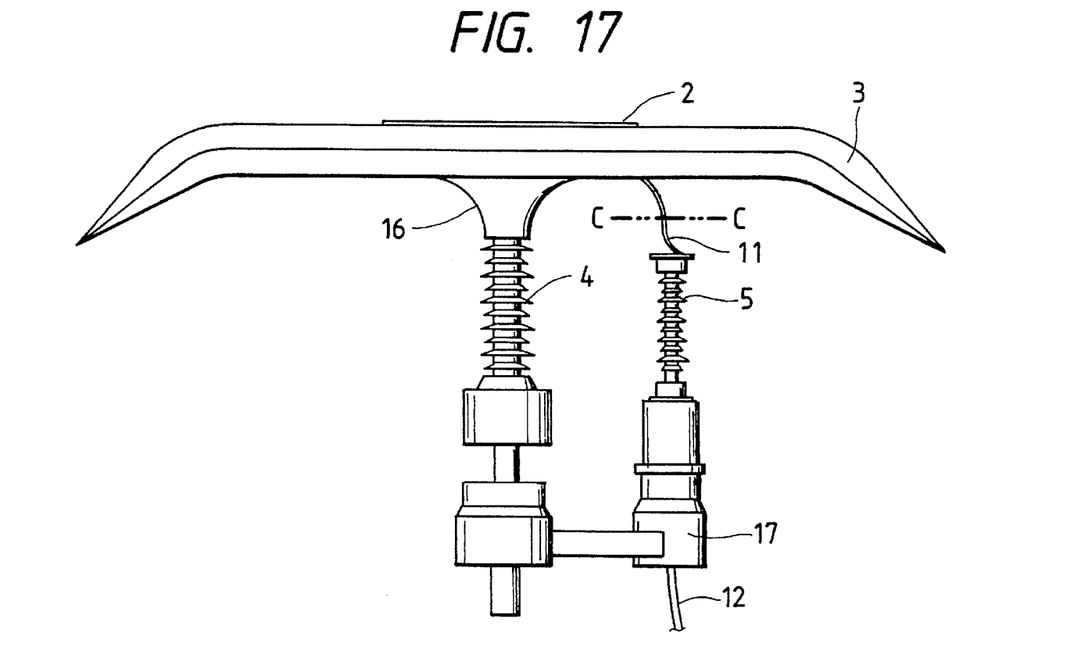
FIG. 17 is an elevational view of the current collecting apparatus of FIG. 16.
Figure 18:
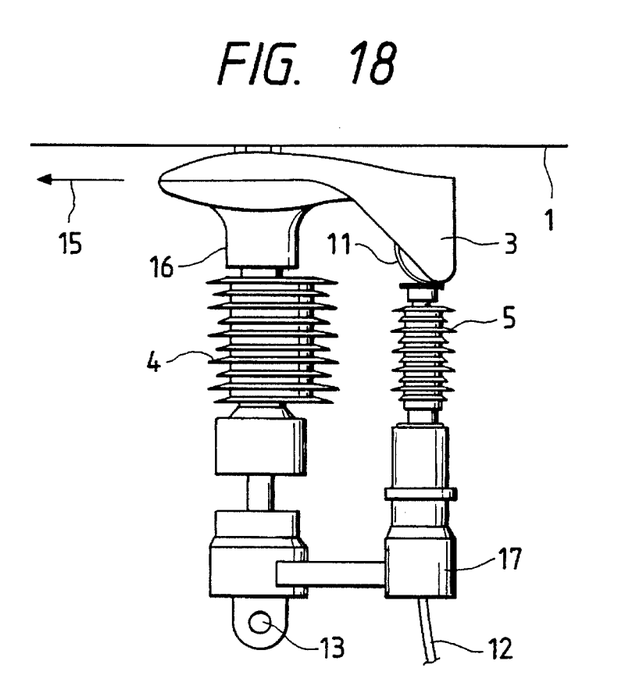
FIG. 18 is a side view of the current collecting apparatus of FIG. 16.
Figure 19:
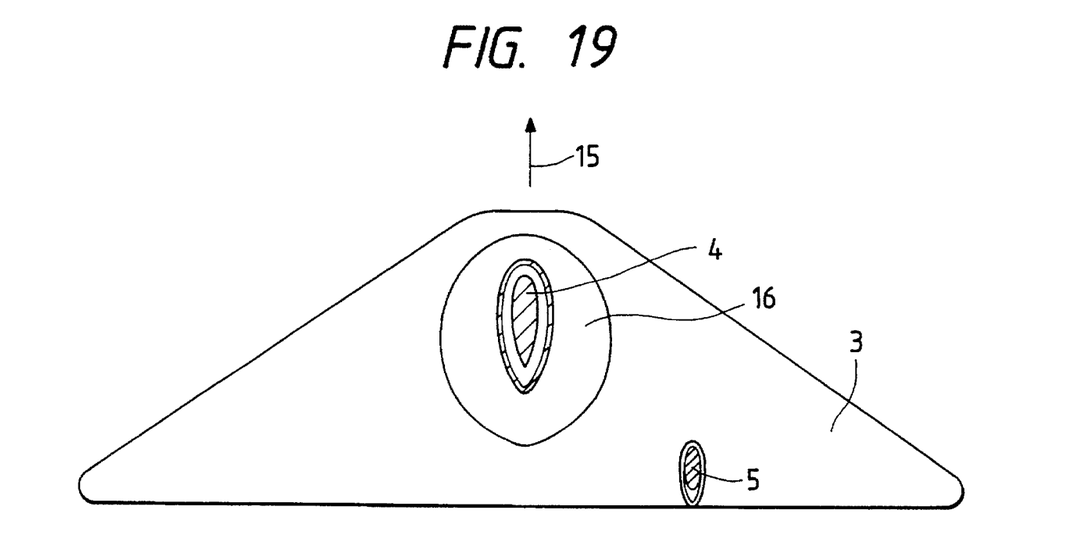
FIG. 19 is a bottom view of the current collecting apparatus of FIG. 16.

As shown in FIG. 17, moreover, the space between one end of the conductor 5 on the power feeder side 1 and the current collector 3 is set greater than the length of the joint 16 between the current collector 3 and the insulator 4. Since the conductor 5 is not placed on the downstream side of the insulator 4, the airflow near the conductor 5 brings about laterally unbalanced dynamic lift fluctuations, which may result in occurring pitching moment to the current collector 3. In order to steer clear of this problem, the conductor 5 is spaced a predetermined distance apart from the current collector 3 so as to retrain the generation of the pitching moment of the current collector 3 sprinting from the disturbance of the airflow on the downstream side of the current collector 3. The improvement of stable current collecting performance is thus planned.

Figure 20:
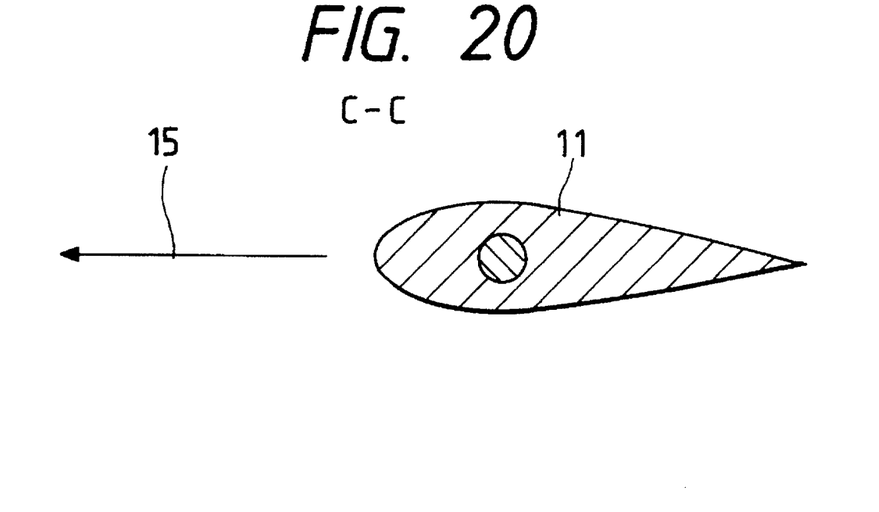
FIG. 20 is a sectional view of a flexible conductor showing still another current collecting apparatus embodying the present invention.

FIG. 20 shows still another current collector embodying the present invention. A cross section (a section taken on line C—C of FIG. 17) perpendicular to the longitudinal direction of a flexible conductor 11 extending from a current collector 3 to a conductor 5 is streamlined. As the flexible conductor 11 is thinner than the other component members of the current collector 3, the airflow on the downstream side of the flexible conductor 11 is considered what develops into a strong secondary dimensional airflow. Therefore, a Karman vortex which is likely to become an aerodynamic noise source is prevented from arising on the downstream side of the flexible conductor 11 by streamlining the cross section perpendicular to the longitudinal direction of the flexible conductor 11 so as to promote noise suppression. Also, just one slider 2 may be used depending on the situation.

Figure 21:
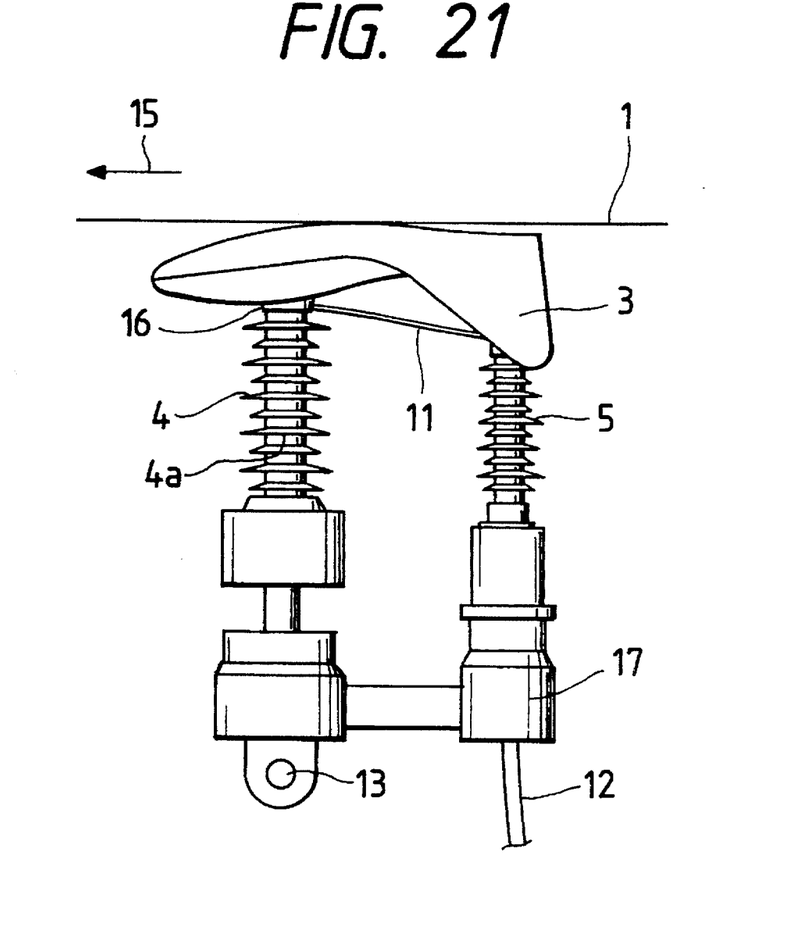
FIG. 21 is a side view of still another current collecting apparatus embodying the present invention.

FIG. 21 shows still another current collector embodying the present invention. A current collector 3 is supported by an insulator 4 in such a state that the current collector 3 is tilted forward. As the current collector 3 is supported by the insulator 4 via a common pedestal 17, an airflow passing by the current collector 3 on the vehicle side 8 is decelerated by the insulator 4. Therefore, there arises a difference in velocity between an airflow passing on the power feeder side 1 of the current collector 3 and what passes on the vehicle side 8 thereof. Consequently, dynamic lift occurs to the current collector 3 from the vehicle side 8 to the power feeder side 1, thus badly affecting the stable current collecting performance of the current collector. The dynamic lift coefficient of a wing generally sharply varies with an increase in an angle of elevation and when an angle of elevation changes by 2~4 degrees, the dynamic lift occurring to the wing becomes 3~5 times greater. Therefore, as shown in FIG. 21, the current collector 3 is supported by the insulator 4 in such a way that it is tilted in the direction in which the vehicle 8 runs with the joint 16 between the current collector 3 and the insulator 4 as a supporting point. The steady dynamic lift acting on the current collector 3 while the vehicle 8 is running at high speed is thus reduced and simultaneously the influence of sharp dynamic lift fluctuations on the current collector 3 is decreased while the vehicle 8 is passing through a tunnel. The current collecting performance is prevented from deteriorating accordingly. Since the current collector 3 is tilted forward with the joint 16 between the current collector 3 and the insulator 4 with a supporting point, each fin of the insulator 4 is set substantially parallel to the airflow. As a result, aerodynamic noise arising from the fins of the insulator 4 can be suppressed.

Figure 22:
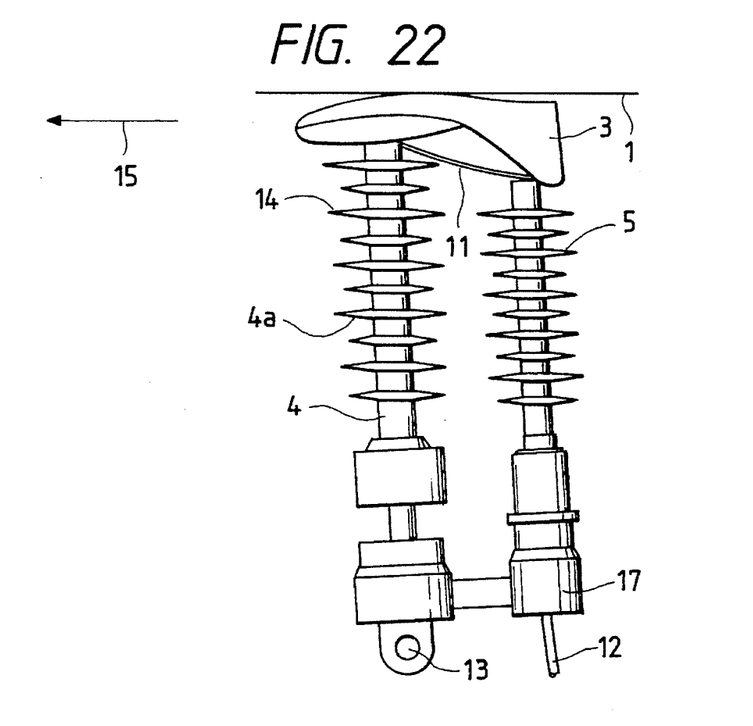
FIG. 22 is a side view of still another current collecting apparatus embodying the present invention.

FIG. 22 shows still another current collecting apparatus embodying the present invention. Like the embodiment of FIG. 21, what is shown in FIG. 22 is also intended to reduce dynamic lift occurring to a current collector 3. In order to decrease the dynamic lift acting on the current collector 3, an insulator 4 is tilted forward in the direction in which a vehicle runs with a pivot mechanism 13 functioning at the time the current collecting apparatus is housed as a supporting point. Moreover, fins 4a are tilted by a predetermined angle with the axial direction of the insulator 4 to make the fins parallel to the floor face of a vehicle before being fitted to the insulator 4 and a conductor 5, so that the fins are disposed in parallel to the airflow. If fins for use are set perpendicular to the axial direction of the insulator and the conductor in this embodiment of the invention, each fin of the insulator 4 is to be formed at an angle with respect to the airflow. The airflow colliding with and peeling off the fin 4a on the upstream side thereof will then collide with the shaft of the insulator 4, thus readily making the fin an aerodynamic noise source. According to the present embodiment of the invention, however, noise is made reducible by tilting the insulator 4 forward at such an angle as to decrease the steady dynamic lift acting on the current collector 3 with the pivot mechanism 13 at the lower end of the insulator 4 as a supporting point and further arranging the fins 4a in parallel to the airflow.

The whirl-wind sound produced from the end of the conductor 5 can also be reduced by forming a curved face at the end of the vehicle side of the conductor 5.

Figure 23:
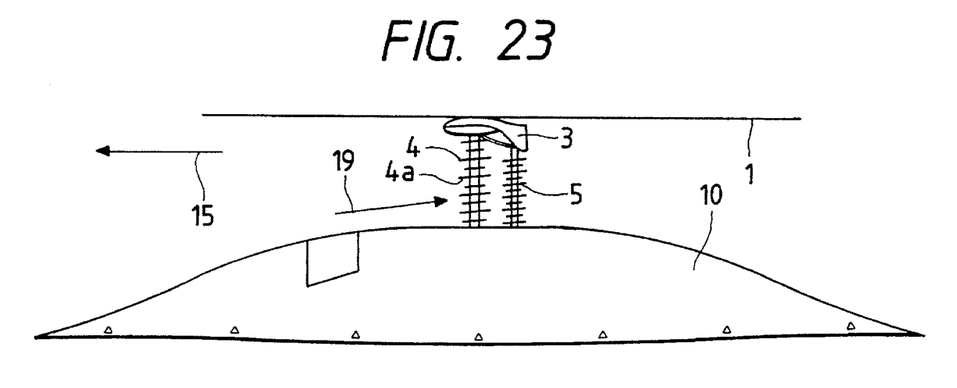
FIG. 23 is a side view of still another current collecting apparatus embodying the present invention.

FIG. 23 shows still another current collecting apparatus embodying the present invention. This embodiment of the invention is so constituted as to take it into consideration that because of a housing dome 10 installed on the roof of a vehicle, an airflow 19 blowing up from the vehicle side 8 toward a power feeder side 1 collides with the current collecting apparatus. In order to prevent aerodynamic noise from being produced from the fins 4a of an insulator 4, the fins 4a are tilted by a predetermined angle with the axial direction of the insulator 4 in the direction in which the vehicle runs to set the fins substantially parallel to the airflow near the current collecting apparatus. Consequently, the direction of each fin is set parallel to the airflow 19 passing along the housing dome with the effect of reducing the disturbance of the airflow due to the fins and consequently reducing noise. The noise reducing effect is enhanced further according to this embodiment of the invention as the insulator and the conductor are offset in the crosswise direction of the vehicle.

Figure 24:
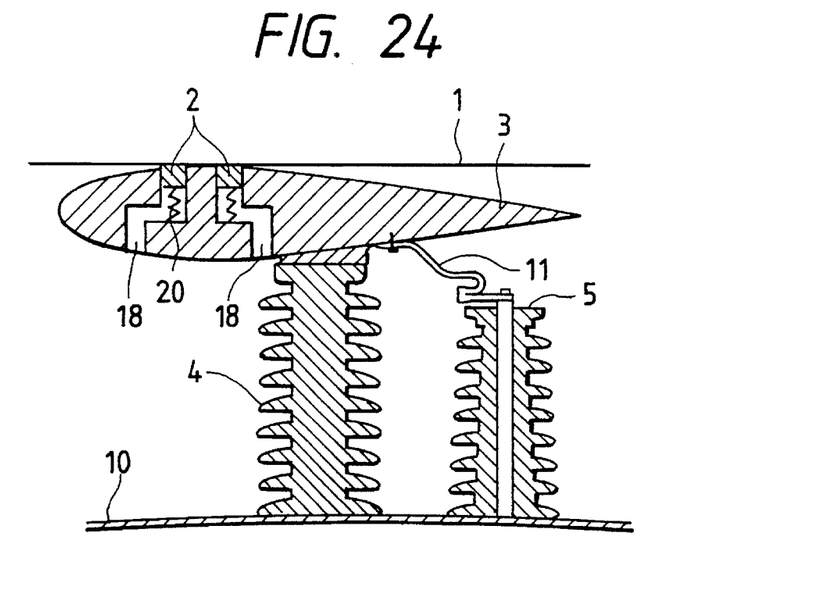
FIG. 24 is a sectional view of still another current collecting apparatus embodying the present invention.
Figure 25:
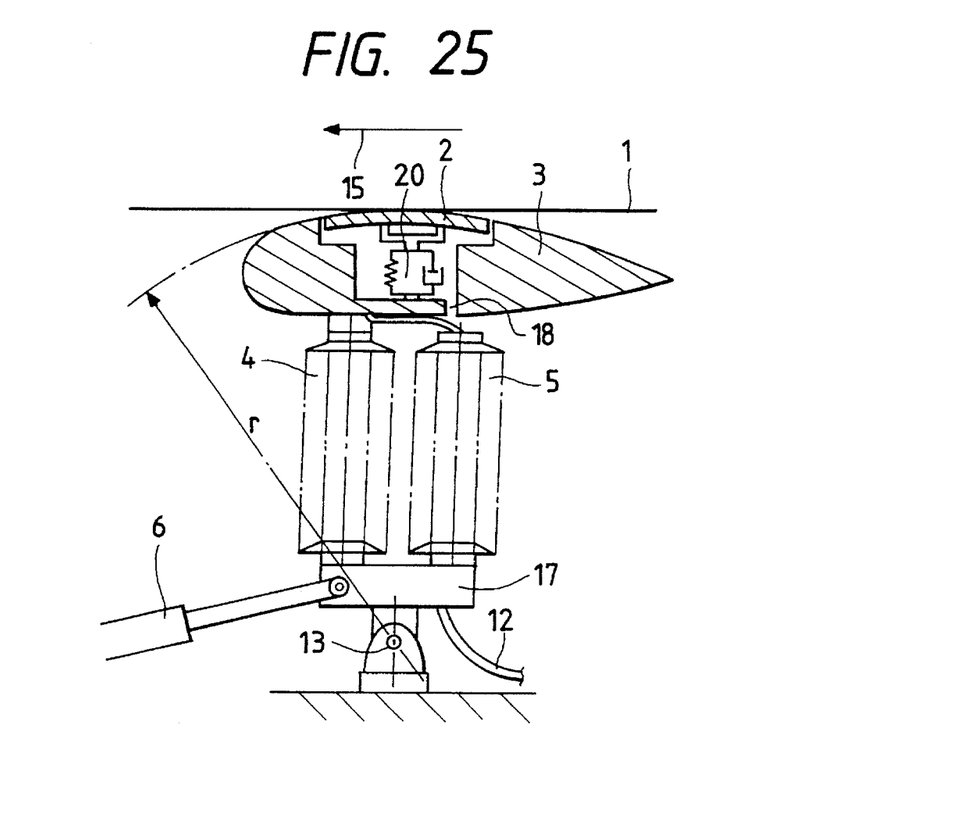
FIG. 25 is a sectional view of still another current collecting apparatus embodying the present invention.

FIGS. 24 and 25 show still another current collecting apparatus embodying the present invention. Sliders 2 are installed on the power feeder side 1 of a current collector 3 and coupled to a spring mechanism 20 for following the vertical displacement of the power feeder 1, the spring mechanism being provided right under the sliders 2. There is provided a space for each slider 2 with respect to the current collector and also a drainage hole 18 on the vehicle side 8 of the current collector 3 near the slider 2 as what is used for preventing rain, snow and the like introduced from that space into the current collector 3 from being stored therein. The profile of the drainage hole 18 ought to be such that no resonance is produced because of the drainage hole 18. The whole member of the current collector 3 can thus be rendered free from corrosion.

Incidentally, the effect of the embodiment of the present invention is noticeably manifested by offsetting the insulator and the conductor in the crosswise direction of the vehicle.

As set forth above, the aerodynamic noise produced from the current collecting apparatus while the vehicle is running at high speed can considerably be reduced by offsetting the locations of the insulator and the conductor in the crosswise direction of the vehicle. Moreover, it is possible to provide a current collecting apparatus fit for use in any high-speed railway vehicle as the dynamic lift applied to the current collector 3 is made reducible by letting the current collector 3 assume a posture along the airflow.

What is claimed is:

1. A current collecting apparatus for a railway vehicle, the apparatus comprising:

a current collector for collecting electric power from a power feeder, an insulator for insulating and supporting the current collector on a vehicle, and a conductor for conducting the power received from the current collector to a load, wherein the conductor and the insulator are disposed a predetermined distance apart in the crosswise direction of the vehicle and are each positioned so as to be exposed to an airflow stream when the apparatus is in use on a running vehicle.

2. A current collecting apparatus as claimed in claim 1, wherein the conductor has a cross section in a crosswise direction of the vehicle smaller than a cross section in a running direction.

3. A current collecting apparatus as claimed in claim 1, wherein an end portion of the conductor on a power feeder side has a curved surface.

4. A current collecting apparatus as claimed in claim 1, wherein the current collector is tilted forward in the direction in which the vehicle runs.

5. A current collecting apparatus as claimed in claim 1, wherein the current collector is provided with drainage holes.

6. A current collecting apparatus as claimed in claim 1, wherein a joint between the insulator and the current collector has a curved surface.

7. A current collecting apparatus as claimed in claim 6, wherein a predetermined space is provided between an end portion of the conductor adjacent the current collector and the current collector.

8. A current collecting apparatus as claimed in claim 1, wherein the conductor is provided below and within a perimeter of the current collector.

9. A current collecting apparatus as claimed in claim 8, wherein the conductor and the insulator are disposed a predetermined distance apart in a running direction of the vehicle, the conductor being provided downstream of the insulator.

10. A current collecting apparatus as claimed in claim 1, wherein each of the insulator and the conductor comprises a cylindrical shaft and a plurality of fins arranged at predetermined intervals at the circumference of the cylindrical shaft, the fins of at least one of the insulator and the conductor being fitted at a predetermined angle with respect to the axial direction of the cylindrical shaft.

11. A current collecting apparatus as claimed in claim 10, wherein the fins of at least one of the insulator and the conductor have a streamlined cross section in a crosswise direction of the vehicle smaller than a cross section in a running direction.

12. A current collecting apparatus as claimed in claim 10, wherein the fins are fitted to the cylindrical shaft at a predetermined angle with respect to a plane perpendicular to the axial direction, wherein the fins are arranged in planes parallel to the air flow stream.

13. A current collecting apparatus as claimed in claim 10, wherein a predetermined space is provided between an end portion of the conductor adjacent the current collector and the current collector, and wherein a flexible conductor is provided connecting the current collector and the end portion of the conductor adjacent the current collector.

14. A current collecting apparatus as claimed in claim 13, wherein the flexible conductor has a cross section in a crosswise direction of the vehicle smaller than a cross section in a running direction.

\* \* \* \* \*